United States Patent
Kondo et al.

(10) Patent No.: US 11,850,814 B2
(45) Date of Patent: *Dec. 26, 2023

(54) DEVICE AND METHOD FOR PRODUCING UNVULCANIZED BAND-SHAPED RUBBER MEMBER

(71) Applicant: The Yokohama Rubber Co., LTD., Tokyo (JP)

(72) Inventors: Masatomo Kondo, Kanagawa (JP); Teruaki Kunimori, Kanagawa (JP); Chihiro Zenyoji, Kanagawa (JP); Jyumpei Oishi, Kanagawa (JP); Haruhisa Hasegawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/596,554

(22) PCT Filed: Apr. 21, 2020

(86) PCT No.: PCT/JP2020/017208
§ 371 (c)(1),
(2) Date: Dec. 13, 2021

(87) PCT Pub. No.: WO2020/255556
PCT Pub. Date: Dec. 24, 2020

(65) Prior Publication Data
US 2022/0212429 A1 Jul. 7, 2022

(30) Foreign Application Priority Data
Jun. 17, 2019 (JP) .................................. 2019-112134

(51) Int. Cl.
*B29D 30/30* (2006.01)
*B29D 30/00* (2006.01)
(Continued)

(52) U.S. Cl.
CPC ......... *B29D 30/30* (2013.01); *B29D 30/0061* (2013.01); *B29D 30/26* (2013.01);
(Continued)

(58) Field of Classification Search
CPC ................ B29D 30/3007; B29D 30/30; B29D 2030/2685; B29D 2030/2671–2692
See application file for complete search history.

(56) References Cited

U.S. PATENT DOCUMENTS

2010/0181000 A1* 7/2010 Takahashi ................. B60C 9/14
156/134
2012/0111473 A1* 5/2012 Hasegawa ............... B29C 66/92
156/64

(Continued)

FOREIGN PATENT DOCUMENTS

EP 3 132 925 A1 2/2017
JP 62-236728 A 10/1987

(Continued)

OTHER PUBLICATIONS

Translation of JP-2014136317-A (Year: 2014).*

*Primary Examiner* — Xiao S Zhao
*Assistant Examiner* — John J DeRusso
(74) *Attorney, Agent, or Firm* — Thorpe North & Western

(57) ABSTRACT

A manufacturing device for an unvulcanized band-shaped rubber member is provided. A position sensor detects, across a width direction of the band-shaped rubber member, leading and trailing ends of the band-shaped rubber member placed in a flat state on a conveyor, holding portions arranged side by side in the width direction hold at least one of the leading or trailing ends, with movement portions allowing the holding portions to move individually in a front-rear direction, the leading and the trailing ends are held by the leading and trailing end holding mechanisms, respectively, and a control unit controls a displacement of the (Continued)

movement portions in the front-rear direction based on data from the position sensor and a target length to adjust elongation in the front-rear direction at or near a held portion held by each of the holding portions to achieve the target length of the band-shaped rubber member.

15 Claims, 16 Drawing Sheets

(51) Int. Cl.
*B29D 30/26* (2006.01)
*B29D 30/44* (2006.01)

(52) U.S. Cl.
CPC ......... *B29D 30/3007* (2013.01); *B29D 30/44* (2013.01); *B29D 2030/2685* (2013.01); *B29D 2030/2692* (2013.01)

(56) References Cited

U.S. PATENT DOCUMENTS

2015/0328853 A1* 11/2015 Denavit ............. B29D 30/0016
　　　　　　　　　　　　　　　　　　　　　　156/394.1
2017/0015076 A1* 1/2017 Nomura ................. B29D 30/48

FOREIGN PATENT DOCUMENTS

| JP | 2003-11245 A | | 1/2003 |
|----|----|----|----|
| JP | 2014136317 A | * | 7/2014 |
| JP | 2015-136826 A | | 7/2015 |

* cited by examiner

DEVICE AND METHOD FOR PRODUCING UNVULCANIZED BAND-SHAPED RUBBER MEMBER

TECHNICAL FIELD

The present technology relates to a manufacturing device and method for an unvulcanized band-shaped rubber member, and particularly relates to a manufacturing device and method for an unvulcanized band-shaped rubber member that can accurately achieve a target length of an unvulcanized band-shaped rubber member that contracts.

BACKGROUND ART

When manufacturing a rubber product such as a tire, a step is included in which longitudinal ends of an unvulcanized band-shaped rubber member are joined together on an outer circumferential surface of a forming drum to form an annular shape. Various devices for accurately joining the longitudinal ends of the band-shaped rubber member together have been proposed (for example, see Japan Unexamined Patent Publication No. 2015-136826).

In the device proposed in Japan Unexamined Patent Publication No. 2015-136826, a contracting portion of a leading end of an unvulcanized band-shaped rubber member that contracts most is stretched by a stretching device, and then applied to an outer circumferential surface of a forming drum (see paragraphs 0022 to 0024, etc.). The leading end and a trailing end are then joined together with an angle of a trailing end edge of the trailing end of the band-shaped rubber member being displaced to be aligned with an angle of a leading end edge of the leading end (see paragraph 0028, etc.).

In this proposal, it is assumed that the contracting portion of the leading end of the band-shaped rubber member that contracts most is the thinnest portion of the leading end (see paragraph 0020, etc.). However, the contracting portion that contracts most is not necessarily the thinnest portion. Thus, it is necessary to accurately determine a length of the unvulcanized band-shaped rubber member that contracts. Furthermore, the angle of the leading end edge of the leading end that is applied to the forming drum is not necessarily uniform, and may vary in the width direction. Thus, by simply aligning the angle of the trailing end edge of the trailing edge of the band-shaped rubber member with the angle of the leading end edge of the leading end, it is not possible to obtain a band-shaped rubber member having a length that allows the leading end and the trailing end to be joined together without gaps entirely across the band-shaped rubber member in the width direction of the band-shaped rubber member. Accordingly, there is room for improvement in accurately manufacturing an unvulcanized band-shaped rubber member having a target length that enables the leading end and the trailing end to be joined together properly.

SUMMARY

The present technology provides a manufacturing device and method for an unvulcanized band-shaped rubber member that can accurately achieve a target length of an unvulcanized band-shaped rubber member that contracts.

A manufacturing device for an unvulcanized band-shaped rubber member according to an embodiment of the present technology is a manufacturing device configured to elongate a band-shaped rubber member to a target length, including a placement portion onto which an unvulcanized band-shaped rubber member cut at a predetermined length is placed in a flat state, a position sensor that detects, across a width direction of the band-shaped rubber member, a leading end and a trailing end of the band-shaped rubber member placed in a flat state, a control unit into which detection data from the position sensor is input, a leading end holding mechanism that holds the leading end, and a trailing end holding mechanism that holds the trailing end, at least one of the leading end holding mechanism and the trailing end holding mechanism including a plurality of holding portions arranged side by side in the width direction of the band-shaped rubber member, and movement portions that each move each of the plurality of holding portions individually in a front-rear direction of the band-shaped rubber member, a displacement of each of the movement portions in the front-rear direction being controlled by the control unit based on the detection data and the target length to adjust a degree of elongation in the front-rear direction at or near a held portion of the band-shaped rubber member held by each of the plurality of holding portions.

A method of manufacturing an unvulcanized band-shaped rubber member according to an embodiment of the present technology is a method in which an unvulcanized band-shaped rubber member cut at a predetermined length is elongated to a target length, the method including detecting across a width direction of the band-shaped rubber member, by a position sensor, a leading end and a trailing end of the band-shaped rubber member placed in a flat state on a placement portion, and inputting detection data from the position sensor into a control unit, and, by configuring at least one of a leading end holding mechanism that holds the leading end and a trailing end holding mechanism that holds the trailing end to include a plurality of holding portions arranged side by side in the width direction of the band-shaped rubber member, and movement portions that each move each of the plurality of holding portions individually in a front-rear direction of the band-shaped rubber member, holding the leading end by the leading end holding mechanism, and holding the trailing end by the trailing end holding mechanism, controlling, by the control unit, based on the detection data and the target length, a displacement of each of the movement portions in the front-rear direction to adjust a degree of elongation in the front-rear direction at or near a held portion of the band-shaped rubber member held by each of the plurality of holding portions.

According to embodiments of the present technology, an unvulcanized band-shaped rubber member cut at a predetermined length is placed in a flat state on a placement portion, and a leading end and a trailing end thereof are detected across a width direction of the band-shaped rubber member by a position sensor, and thus, distribution data of lengths in the width direction of the band-shaped rubber member (that is, distribution data of contracted lengths in the width direction) can be acquired. Then, at least one of the leading end and the trailing end of the band-shaped rubber member is held by a plurality of holding portions arranged side by side in the width direction of the band-shaped rubber member, and based on the detection data from the position sensor and the target length, by controlling, by a control unit, a displacement in the front-rear direction of each of the movement portions that each move each of the holding portions individually in the front-rear direction, the band-shaped rubber member that contracts can be elongated to a target length with good accuracy.

DETAILED DESCRIPTION

Figure 1:
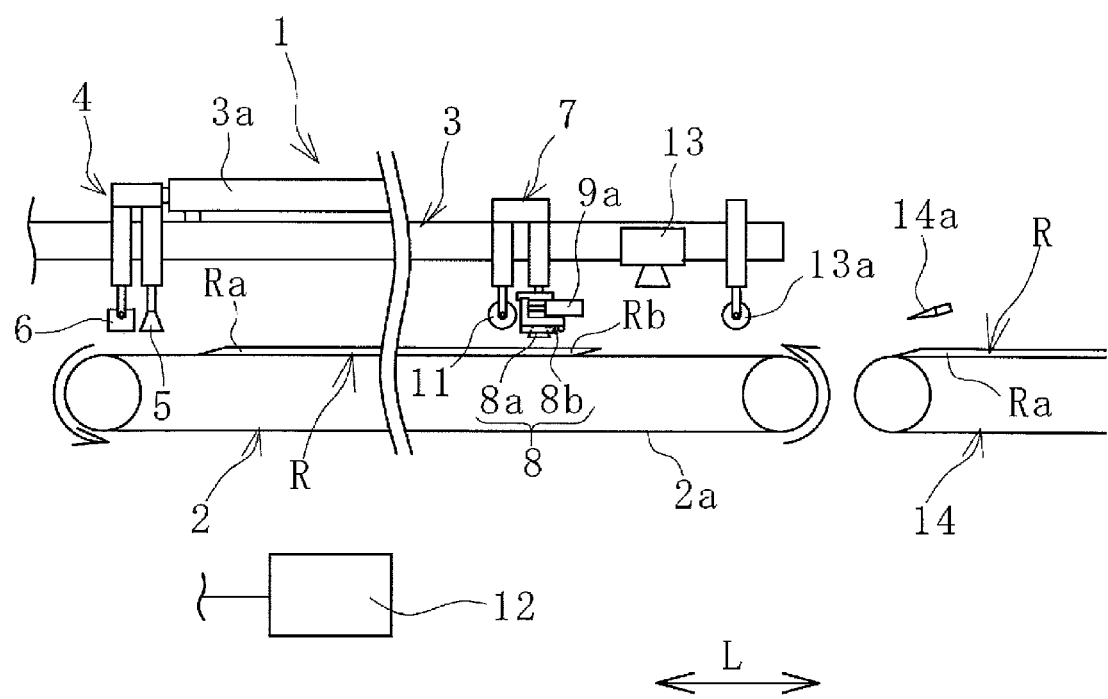
FIG. 1 is an explanatory diagram illustrating a manufacturing device for an unvulcanized band-shaped rubber member in a side view, according to an embodiment of the present technology.
Figure 2:
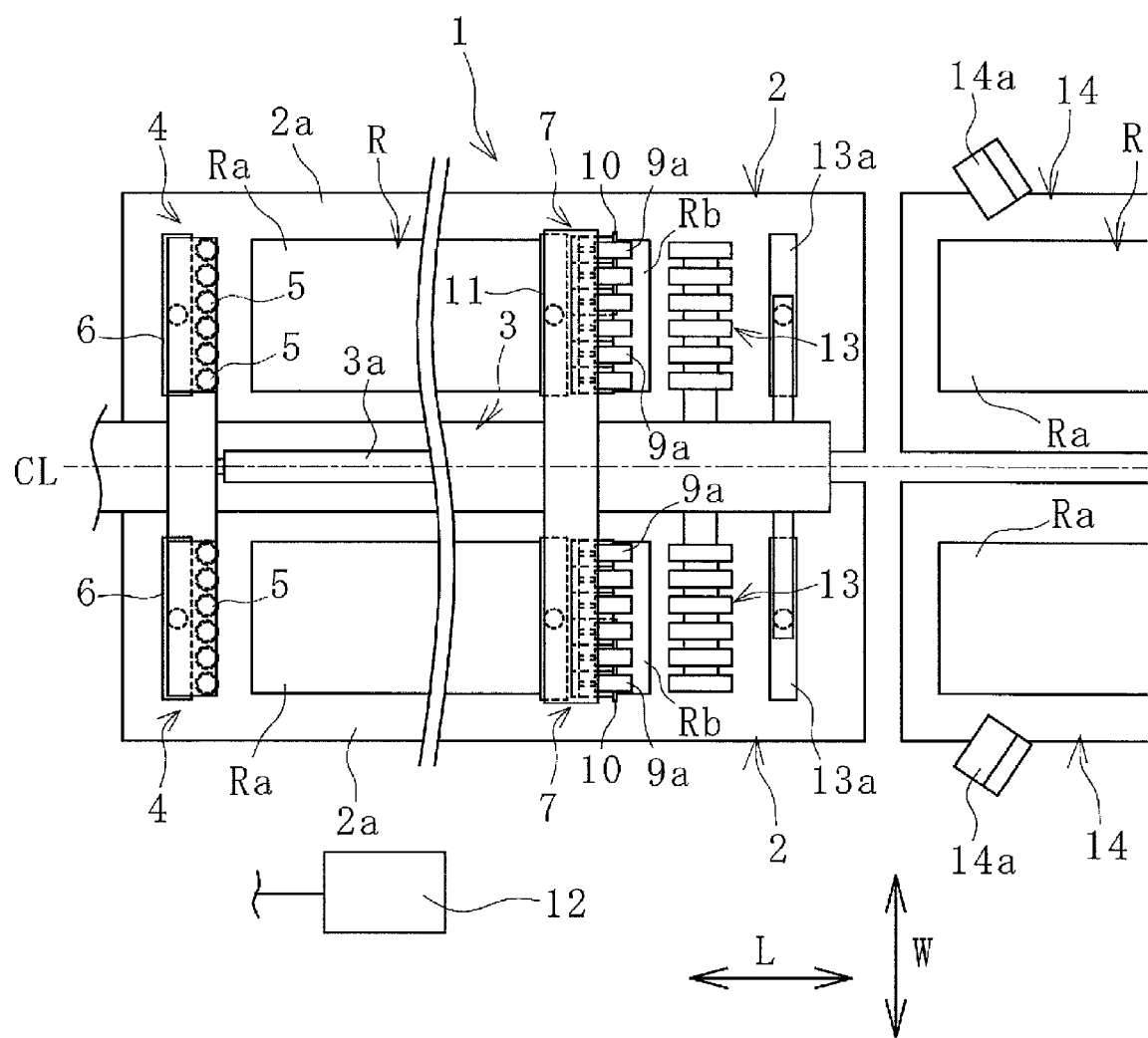
FIG. 2 is an explanatory diagram illustrating the manufacturing device of FIG. 1 in a plan view.
Figure 3:
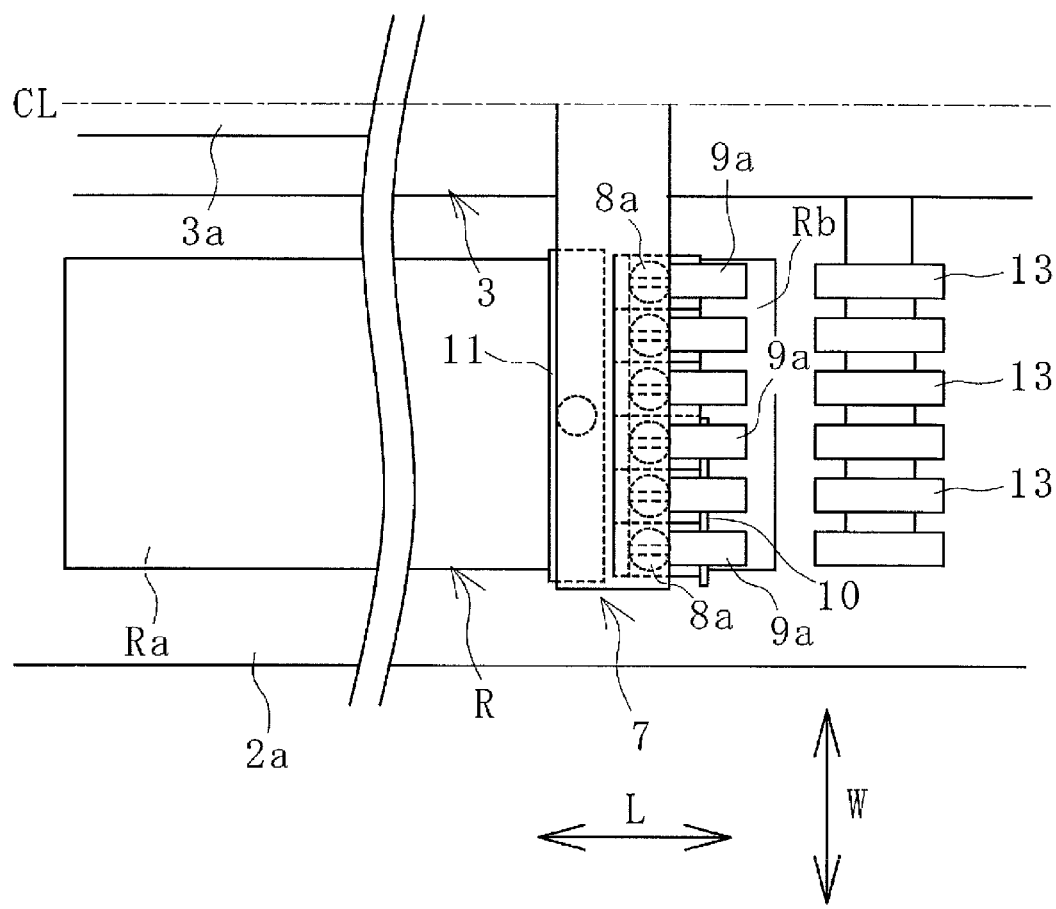
FIG. 3 is an enlarged view illustrating a part of FIG. 2.
Figure 4:
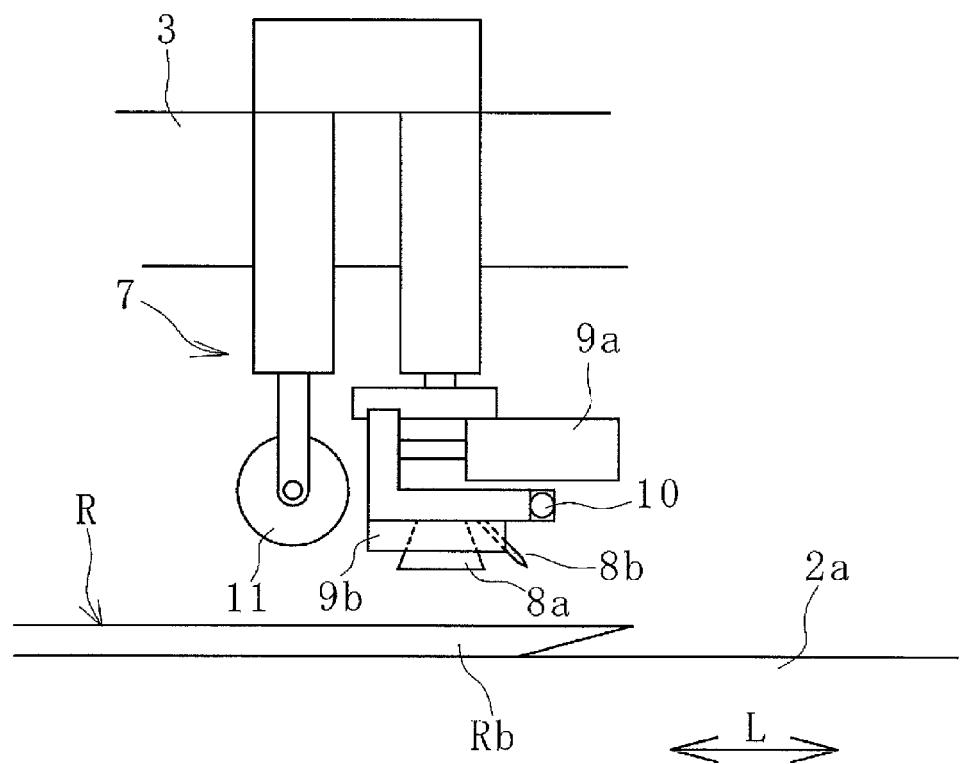
FIG. 4 is an explanatory diagram illustrating a trailing end holding mechanism in a side view.

Hereinafter, a manufacturing device and method for a band-shaped rubber member according to embodiments of the present technology will be described based on embodiments with reference to the drawings.

A manufacturing device 1 for an unvulcanized band-shaped rubber member according to an embodiment of the present technology (hereinafter referred to as manufacturing device 1) illustrated in FIGS. 1 to 4 is disposed downstream side of an upstream side conveyance conveyor 14. A cutter 14a is disposed at a leading end of the upstream side conveyance conveyor 14. An unvulcanized band-shaped rubber member R conveyed toward the manufacturing device 1 by the upstream side conveyance conveyor 14 is cut to a predetermined length by the cutter 14a.

Examples of the band-shaped rubber member R include tire components such as tread rubber, side rubber, and the like of a tire formed of unvulcanized rubber. Since the band-shaped rubber member R that is cut contracts over time, the cut band-shaped rubber member R eventually becomes shorter than the predetermined length that is cut. This contraction length is not necessarily uniform in a width direction W of the band-shaped rubber member R, and differs depending on, for example, thickness or the like. The manufacturing device 1 elongates the unvulcanized band-shaped rubber member R cut at a predetermined length to the target length G.

The manufacturing device 1 includes a placement portion 2 onto which an unvulcanized band-shaped rubber member R cut at a predetermined length is placed in a flat state, a position sensor 13, a control unit 12 into which the detection data from the position sensor 13 is input, a leading end holding mechanism 4, and a trailing end holding mechanism 7. Furthermore, in this embodiment, a pressing roller 13a is provided above the trailing end of the conveyance conveyor 2.

In this embodiment, a conveyance conveyor 2 that conveys the band-shaped rubber member R in a flat state is used as the placement portion 2. The conveyance conveyor 2 includes a conveyor belt 2a that is tensioned between the front and back pulleys, and the conveyor belt 2a is driven to rotate by a drive source such as a servo motor. It is sufficient for the placement portion 2 to have the band-shaped rubber member R placed in a flat state, and a metal plate, resin plate, or the like can also be used.

The direction of the arrow L in the drawings indicates a front-rear direction of the conveyance conveyor 2 and the band-shaped rubber member R placed on the conveyance conveyor 2. The direction of the arrow W indicates a width direction of the conveyance conveyor 2 and the band-shaped rubber member R placed on the conveyance conveyor 2. The dot-dash line CL in FIG. 2 indicates the center position in the width direction W of the frame 3 extending in the front-rear direction L.

The movement of the conveyance conveyor 2, the leading end holding mechanism 4, the trailing end holding mechanism 7, and the pressing roller 13a are controlled by the control unit 12. The control unit 12 also determines the speed of the conveyance conveyor 2, and thus a displacement of the band-shaped rubber member R conveyed by the conveyance conveyor 2 in the front-rear direction L is also determined.

In this embodiment, transport conveyors 2 are disposed one on each side at symmetrical positions with each other with the dot-dash line CL interposed therebetween. A leading end holding mechanism 4 and a trailing end holding mechanism 7 disposed above each conveyor belt 2a are movably attached to the frame 3. Also, a position sensor 13 disposed above the trailing end of each of the conveyor belts 2a, and a pressing roller 13a are attached to the frame 3.

Each of devices (such as, the conveyance conveyor 2, the leading end holding mechanism 4, the trailing end holding mechanism 7, the position sensor 13, and the pressing roller 13a) arranged at symmetrical positions with each other with the dot-dash line CL interposed therebetween will be configured and moved in a similar manner, and thus a device arranged on one side with the dot-dash line CL interposed therebetween will be described below. Note that devices such as the conveyance conveyor 2, the leading end holding mechanism 4, the trailing end holding mechanism 7, the position sensor 13, and the pressing roller 13a are not limited to a configuration in which the devices are installed side by side in two rows with the dot-dash line CL interposed therebetween, as in this embodiment, and may be configured to be installed in one row.

The leading end holding mechanism 4 includes a leading end holding portion 5, and in this embodiment further includes a leading end pressing portion 6. It is sufficient that the leading end holding portion 5 can hold the leading end Ra of the band-shaped rubber member R, and, for example, a suction pad is employed. The leading end holding portion 5 is moved vertically by a cylinder or the like, and moves toward and away from the placement surface of the conveyor belt 2a. A plurality of leading end holding portions 5 are arranged side by side in the width direction W.

One rod-like body that extends in the width direction W is employed as the leading end pressing portion 6. The leading end pressing portion 6 can be divided in the width direction W to form a plurality of the leading end pressing portions arranged side by side. The leading end pressing portion 6 is moved vertically by a cylinder or the like, and moves toward and away from the placement surface of the conveyor belt 2a. The leading end holding mechanism 4 (leading end holding portion 5 and leading end pressing portion 6) is moved in the front-rear direction L by an advancing/retracting cylinder 3a installed in the frame 3.

The trailing end holding mechanism 7 includes a plurality of trailing end holding portions 8 arranged side by side in the width direction W, and movement portions 9a that each moves each of the trailing end holding portions 8 individually in the front-rear direction L. In this embodiment, a needle-like body 8b is employed in addition to the suction pad 8a as the trailing end holding portion 8. The suction pad 8a protrudes downward from the lower surface of a block base 9b to which the suction pad 8a is attached, to approximately 1 mm or more and 2 mm or less. The suction pad 8a can swing in the width direction W and the front-rear direction L.

A needle-like body 8b protrudes obliquely rearward from the block base 9b. The needle-like body 8b may be optionally provided. An electric cylinder is employed as the movement portion 9a, but a fluid cylinder can also be used. When the movement portion 9a moves the block base 9b in the front-rear direction L, thereby the trailing end holding portion 8 moves in the front-rear direction L.

In this embodiment, all of the trailing end holding portions 8 arranged side by side in the width direction W are configured to be movable in the front-rear direction L, but only a portion of the trailing end holding portion 8 can be configured to be movable in the front-rear direction L. For example, only two or three trailing end holding portions 8 adjacent in the width direction W may be configured to be moveable in the front-rear direction L. The number of trailing end holding portions 8 arranged side by side is preferably three or more, for example, three or more and eight or less. In this embodiment, the size of the width direction W of each of the trailing end holding portions 8 is identical to each other, but the trailing end holding portion 8 having different sizes in the width direction W can also be mixed.

In this embodiment, the trailing end holding mechanism 7 further includes one pressing bar 10 disposed rearward of the trailing end holding portion 8 and extending in the width direction W, and one pressing roller 11 disposed in front of the trailing end holding portion 8. The pressing bar 10 installed on the block base 9b can move vertically independently. The pressing bar 10 can extend at an appropriate length in the width direction W, and in this embodiment, extends from one end side to a halfway position in the width direction W of the six trailing end holding portions 8 arranged side by side. The pressing roller 11 can be divided in the width direction W to form a plurality of the pressing rollers arranged side by side.

The trailing end holding portion 8, the movement portion 9a, the block base 9b, and the pressing bar 10 are integrally moved vertically by the respective cylinders or the like, and move toward and away from the placement surface of the conveyor belt 2a. The pressing roller 11 is also moved vertically by a cylinder or the like, and moves toward and away from the placement surface of the conveyor belt 2a. The trailing end holding mechanism 7 (the trailing end holding portion 8, the movement portion 9a, the block base 9b, the pressing bar 10, and the pressing roller 11) move in the front-rear direction L along the frame 3 by a servo motor or the like.

As described above, the plurality of trailing end holding portions 8 arranged side by side in the width direction W and the movement portions 9a that each moves each of the trailing end holding portion 8 individually in the front-rear direction is provided only in the trailing end holding mechanism 7, but the functions of these trailing end holding portion 8 and the movement portion 9a need only be provided on at least one of the leading end holding mechanism 4 and the trailing end holding mechanism 7. Accordingly, only the leading end holding mechanism 4 or the leading end holding mechanism 4 and the trailing end holding mechanism 7 can be configured to have an identical function to the trailing end holding portion 8 and the movement portion 9a.

The position sensor 13 detects, across the entire width in the width direction W, the leading end and the trailing end of the band-shaped rubber member R placed in a flat state on the conveyance conveyor 2. In other words, the distribution data of the length in the width direction W of the band-shaped rubber member R is detected. Detection data from the position sensor 13 is successively input into the control unit 12. A non-contact sensor (optical sensor, laser sensor, ultrasonic sensor, or the like) is preferably used as the position sensor 13.

In this embodiment, the position sensor 13 is installed individually for each of the trailing end holding portions 8. In other words, one position sensor 13 and one trailing end holding portion 8 make one set. There may be a single position sensor 13, as long as the leading end and the trailing end of the band-shaped rubber member R can be detected across the entire width in the width direction W, for example, by making the position sensor 13 moveable in the width direction W. As in this embodiment, when the position sensor 13 is provided with each of the trailing end holding portions 8, it is not necessary to move the position sensor 13 in the width direction W, which is advantageous in simplifying the device and ensuring the detection accuracy of the position sensor 13.

Data of the target length G of the band-shaped rubber member R is also input into the control unit 12. The control unit 12 controls the displacement of each of the movement portions 9a in the front-rear direction L based on the detection data from the position sensor 13 and the target length G. As a result, the degree of elongation in the front-rear direction L at or near the held portion of the band-shaped rubber member R held by each of the trailing end holding portions 8 is adjusted.

Now, an example of procedures of manufacturing a band-shaped rubber member R having a target length G using the manufacturing device 1 will be explained.

Figure 5:
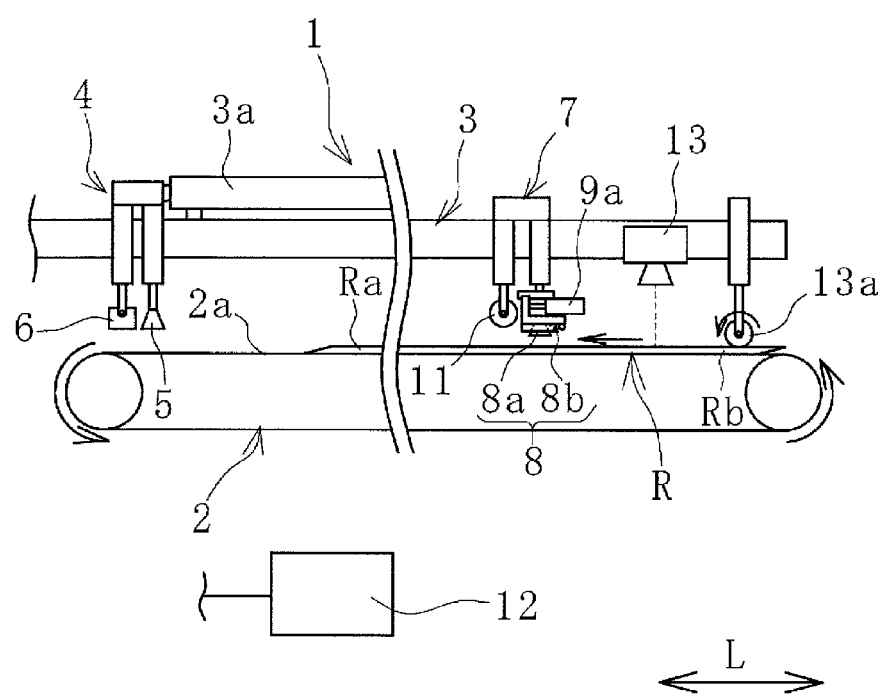
FIG. 5 is an explanatory diagram illustrating a step of detecting the leading end and the trailing end of the band-shaped rubber member in a side view.

As illustrated in FIG. 5, by rotationally driving the conveyor belt 2a on which the band-shaped rubber member R cut to a predetermined length is placed, the band-shaped rubber member R is conveyed forward. The band-shaped rubber member R is pressed by the pressing roller 13a at the trailing end of the conveyance conveyor 2. Accordingly, immediately after the band-shaped rubber member R is placed on the conveyance conveyor 2, the band-shaped rubber member R is placed on the conveyor belt 2a in a flat state while being compression bonded to the placement surface of the conveyor belt 2a.

Each of the position sensors 13 detects the leading end and the trailing end of the band-shaped rubber member R passing below. As a result, the leading end and the trailing end of the band-shaped rubber member R are detected across the width direction W, and the detection data is sequentially input into the control unit 12. The detection data can be acquired by moving the position sensor 13 in the front-rear direction L without operating the conveyance conveyor 2 on which the band-shaped rubber member R is placed in a flat state. In other words, the detection data may be acquired by moving the band-shaped rubber member R and the conveyor belt 2a relative to each other in the front-rear direction.

Figure 6:
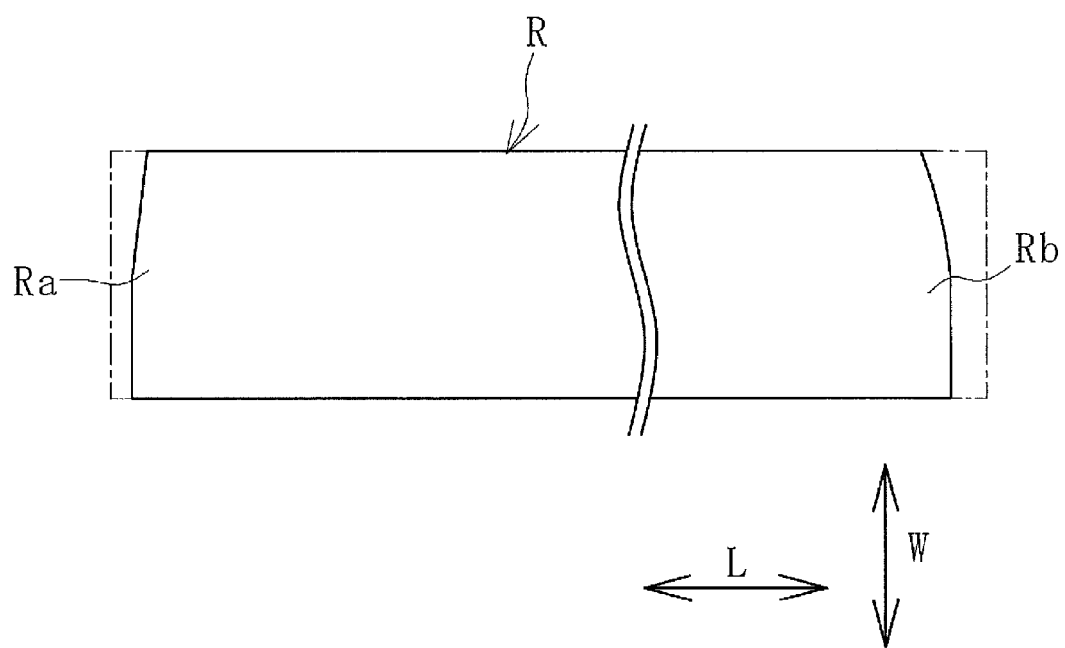
FIG. 6 is an explanatory diagram schematically illustrating the shape of the band-shaped rubber member detected in plan view.

The control unit 12 calculates distribution data of the length in the width direction W of the band-shaped rubber member R based on the detection data from the position sensor 13 and the conveyance speed of the conveyance conveyor 2. As a result, the shape of the band-shaped rubber member R illustrated in FIG. 6 is determined. The dot-dash line in FIG. 6 indicates the shape of the band-shaped rubber member R when cut to a predetermined length. In other words, the distribution data of the contraction length in the width direction W of the band-shaped rubber member R can be acquired by the detection data from the position sensor 13. In FIG. 6, the leading end Ra and the trailing end Rb contract in the front-rear direction L, and the contracted length thereof is not uniform in the width direction W. Note that the band-shaped rubber member R also contracts in the width direction W, but the amount of contraction is significantly smaller and negligible in comparison to that in the front-rear direction L.

In cases where it has been found that little contraction occurs at a specific position in the width direction W of the band-shaped rubber member R, the length of the band-shaped rubber member R at the specific position in the width direction W can also be used as a reference length. Then, the length of the band-shaped rubber member R at other positions in the width direction W can be calculated based on the detection data from the position sensor 13 with respect to the reference length at the specific position, and calculate the distribution data of the length in the width direction W of the band-shaped rubber member R (distribution data of the contraction length).

Here, for example, each of the trailing end holding portions 8 arranged side-by-side can be configured individually to be movable in the width direction W together with the corresponding movement portion 9a and the position sensor 13. Then, one set of the trailing end holding portion 8, the movement portion 9a, and the position sensor 13 is moved and disposed in the specific position in the width direction W described above. The other sets (of the trailing end holding portion 8, the movement portion 9a, and the position sensor 13) are moved and disposed, for example, in the width direction W to have a predetermined spacing between adjacent sets in the width direction W.

Incidentally, the band-shaped rubber member R cut to a predetermined length contracts over time in an unconstrained state. In this embodiment, as illustrated in FIG. 5, before detecting the leading end and the trailing end of the band-shaped rubber member R across the width direction W by the position sensor 13, a pressing roller 13a rolls on the top surface of the band-shaped rubber member R placed in the flat state, and the band-shaped rubber member R is compression bonded to the conveyor belt 2a. As a result, contraction of the band-shaped rubber member R during detection by the position sensor 13 is suppressed. Accordingly, distribution data of the length of the band-shaped rubber member R in the width direction W can be acquired with greater accuracy.

When the placement surface of the conveyor belt 2a is a placement surface onto which the band-shaped rubber member R placed in the flat state is attached without being shifted in the front-rear direction L and which is in a state with no expansion or contraction in the front-rear direction L, it becomes increasingly advantageous to suppress the contraction of the band-shaped rubber member R during detection by the position sensor 13. For example, since the conveyor belt 2a is tensioned between pulleys, the placement surface is in a state with no expansion or contraction. Thus, for the placement surface, a specification is preferably employed in which the band-shaped rubber member R placed in a flat state is attached without being shifted in the front-rear direction L (such as a material or surface treatment having excellent adhesion to the band-shaped rubber member R).

Figure 7:
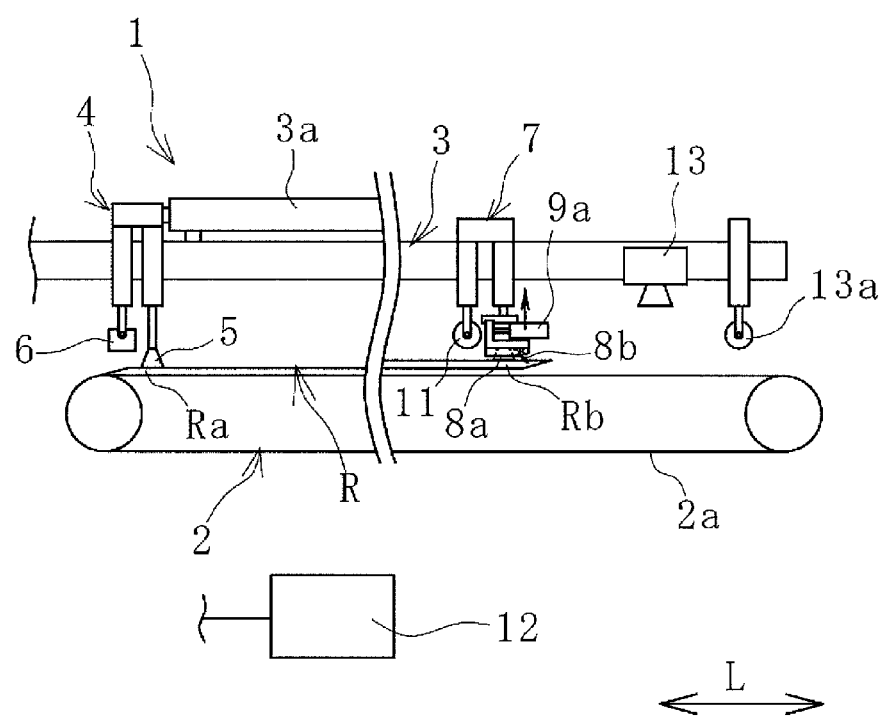
FIG. 7 is an explanatory diagram illustrating, in a side view, a step of holding the leading end and the trailing end of the band-shaped rubber member by a leading end holding mechanism and a trailing end holding mechanism, respectively.
Figure 8:
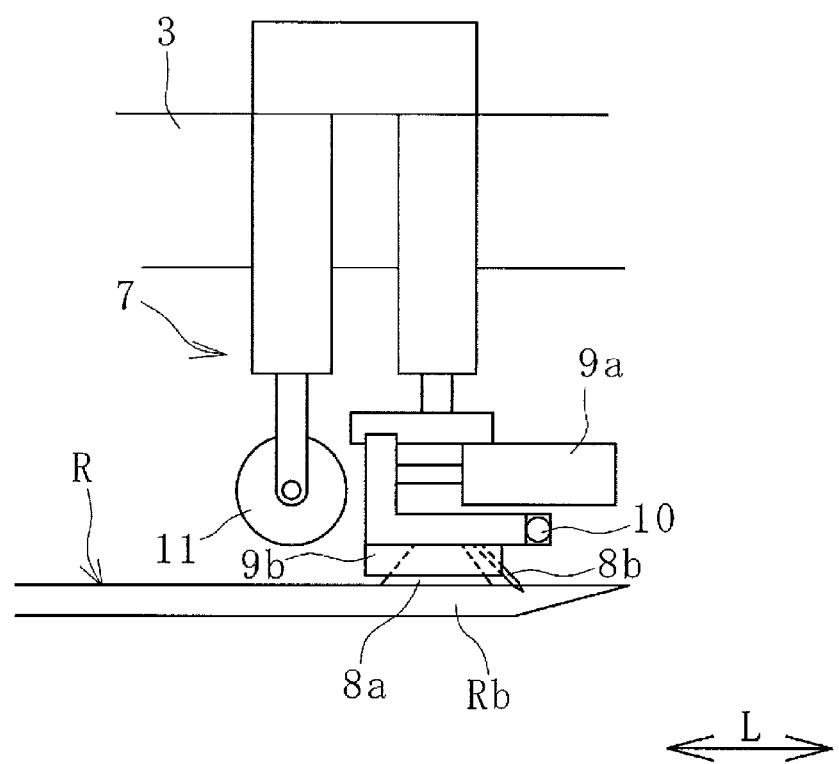
FIG. 8 is an enlarged explanatory diagram of the periphery of the trailing end holding portion of FIG. 7.

Next, as illustrated in FIG. 7, the leading end holding portion 5 is moved downward and is brought into contact with the top surface of the leading end Ra to adhere the top surface by suctioning the air. Furthermore, the suction pad 8a is brought into contact with the top surface of the trailing end Rb by moving the trailing end holding portion 8 downward to adhere the top surface by suctioning the air.

With the downward movement of the suction pad 8a, the needle-like body 8b penetrates into a position midway in the thickness direction of the band-shaped rubber member R. In this step, the leading end pressing portion 6 is in an upper position not in contact with the leading end Ra, and the pressing roller 11 is in an upper position not in contact with the trailing end Rb. Note that, in a state where the band-shaped rubber member R is not placed on the conveyor belt 2a, the needle-like body 8b is set not to contact the conveyor belt 2a even when the suction pad 8a is moved downward to the position of the conveyor belt 2a.

The thickness of the band-shaped rubber member R is not constant in the width direction W, and is often changed. That is, since the band-shaped rubber member R often has a unique cross-sectional shape (profile) rather than a simple cross-sectional square, the thickness (weight) of the band-shaped rubber member R at the position where each suction pad 8a is adhered is different. Thus, the suction force by each suction pad 8a is not limited to being set uniformly, and can be set differently depending on the thickness of the band-shaped rubber member R at the position at which each of the suction pads 8a adheres. For example, for the suction pad 8a that adheres at a position where the thickness of the band-shaped rubber member R, the suction force is set to be greater. Similarly, the suction pad of the leading end holding portion 5 can also set the suction force differently depending on the position in the width direction W.

Figure 9:
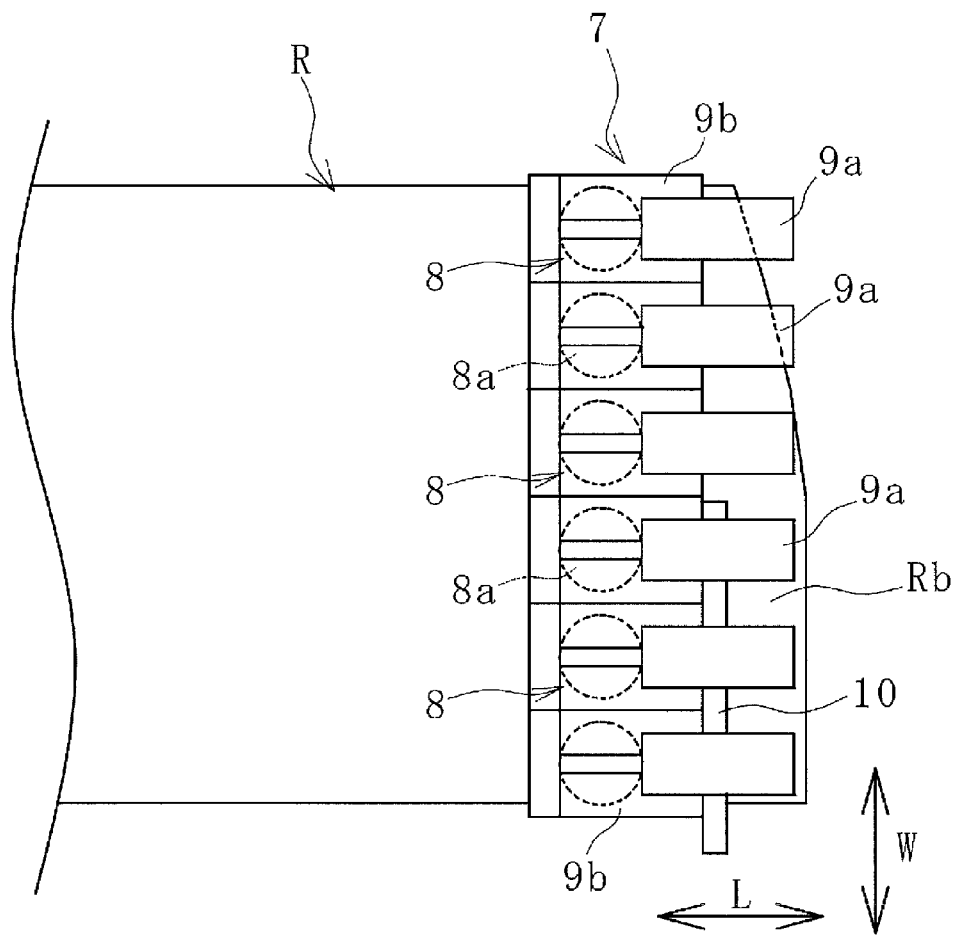
FIG. 9 is an explanatory diagram illustrating the periphery of the trailing end of the band-shaped rubber member of FIG. 8 in a plan view.

In this way, the leading end Ra is held by the leading end holding portion 5, and the trailing end Rb is held by the trailing end holding portion 8. The band-shaped rubber member R is separated from at least the trailing end Rb and the periphery thereof above the conveyor belt 2a. At this time, as illustrated in FIG. 9, the trailing end Rb is held by a plurality of trailing end holding portions 8 arranged side by side in the width direction W, and each of the trailing end holding portions 8 is individually movable in the front-rear direction L by the movement portion 9a corresponding to each of the trailing end holding portions 8.

Figure 10:
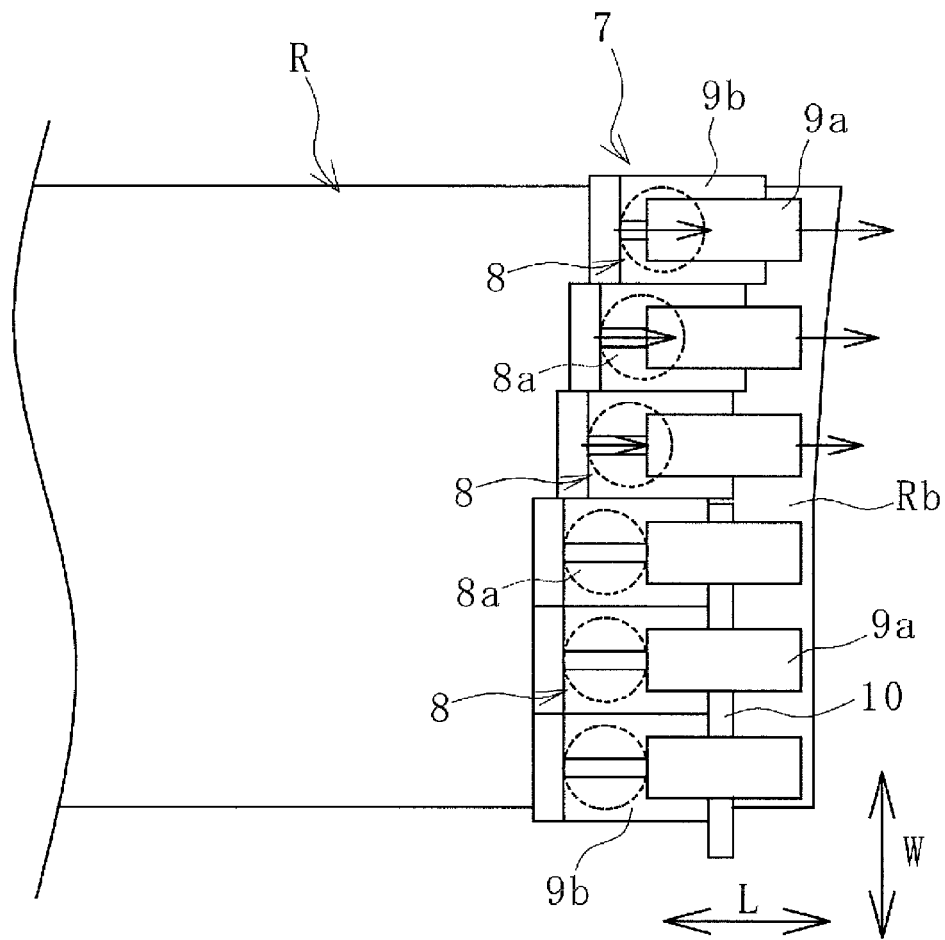
FIG. 10 is an explanatory diagram illustrating, in a plan view, a step of stretching the trailing end of the band-shaped rubber member of FIG. 9.

Next, as illustrated in FIG. 10, the control unit 12 controls the displacement of each of the movement portions 9a in the front-rear direction L based on the detection data from the position sensor 13 and the target length G. For example, the difference between the length of the band-shaped rubber member R and the target length G at the position in the width direction W in which the respective position sensors 13 are disposed is calculated, and the displacement of each of the movement portions 9a in the front-rear direction L is controlled by the control unit 12 based on the respective difference. In other words, each of the trailing end holding portions 8 is moved by each of the movement portions 9a by the calculated respective difference.

As a result, the degree of elongation in the front-rear direction L at or near the held portion of the trailing end Rb held by each of the trailing end holding portions 8 is adjusted. For example, in the trailing end holding portion 8 in the width direction position where the contraction in the front-rear direction L of the band-shaped rubber member R is greater, the displacement in the front-rear direction L is set to be greater. In this embodiment, the higher the upward position of the upper three movement portions 9a in the drawing, the greater the displacement, and the displacement of the lower three movement portions 9a in the drawing is zero.

Figure 11:
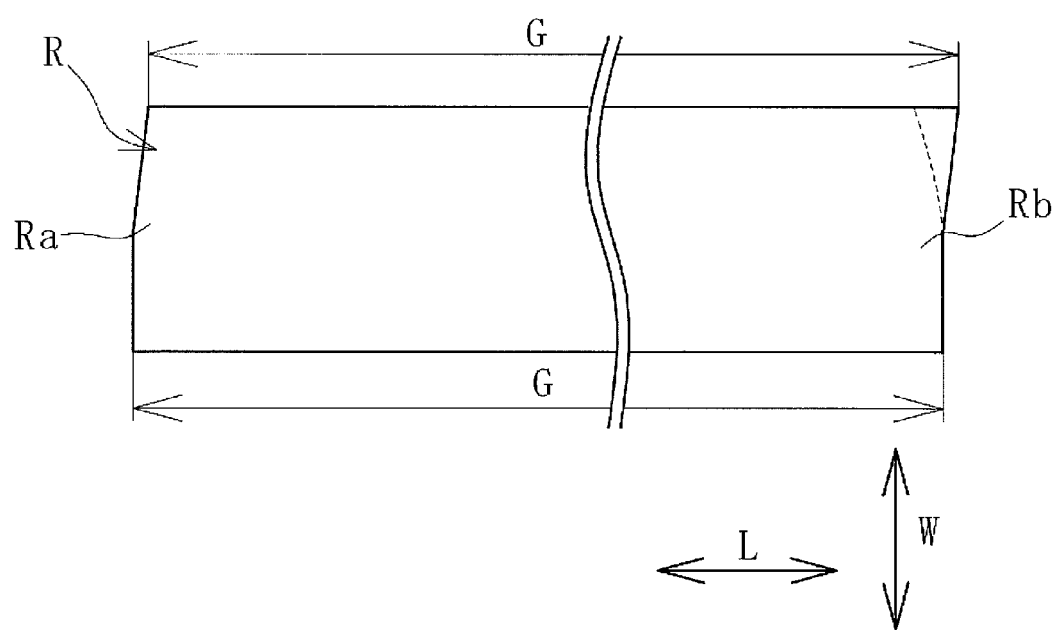
FIG. 11 is an explanatory diagram schematically illustrating an elongated band-shaped rubber member in a plan view.

As a result of such controlling of the displacement, as illustrated in FIG. 11, the length of the band-shaped rubber member R is elongated to the target length G. The dashed line in FIG. 11 illustrates the trailing end of the band-shaped rubber member R before being elongated. In this embodiment, although only the trailing end Rb side is elongated, and the leading end Ra is not substantially elongated, the length of the band-shaped rubber member R is generally the target length G throughout the entire width in the width direction W.

When the suction pad 8a that adheres and holds the top surface of the trailing end Rb is employed as the trailing end holding portion 8, the trailing end Rb is advantageously held without unnecessarily being deformed. By employing the needle-like body 8b as in this embodiment, the trailing end Rb is advantageously reliably held, thus making it easier to elongate the trailing end Rb as needed in the front-rear direction L.

The movement speed of each of the movement portions 9a in the front-rear direction L can be varied, but the speed is preferably set at an identical speed. Setting each movement speed to an identical speed is advantageous in preventing the occurrence of defects, such as damage, without applying an excessive external force to the unvulcanized rubber (trailing end Rb) to be elongated, even when the displacements of each of the trailing end holding portion 8 in the front-rear direction L differ.

As described above, since at least one of the leading end Ra and the trailing end Rb of the band-shaped rubber member R is held by a plurality of holding portions 8 arranged side by side in the width direction W, and each of the holding portions 8 is individually moved in the front-rear direction based on the detection data from the position sensor 13 and the target length G, the band-shaped rubber member R that contracts can be elongated to the target length G across the entire width in the width direction W more accurately. Even with the band-shaped rubber member R having a large contraction over time, the target length G can be achieved.

Figure 12A:
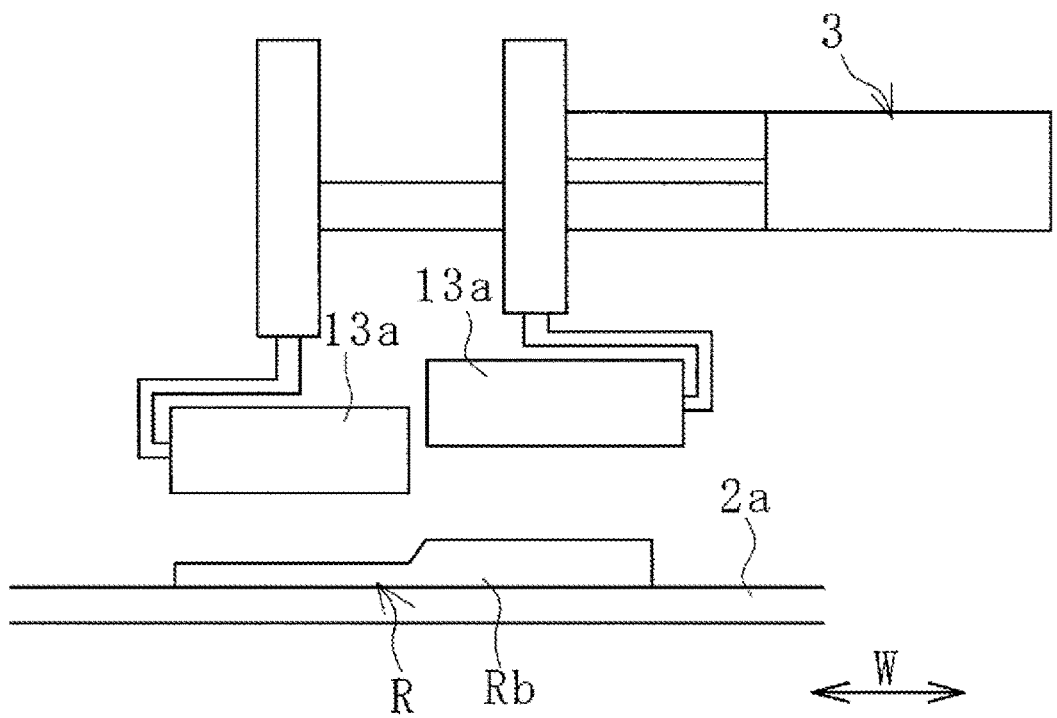
FIG. 12 is an explanatory diagram illustrating, in a front view, a modified example of a pressing roller disposed above a trailing end of the conveyance conveyor.
Figure 12B:
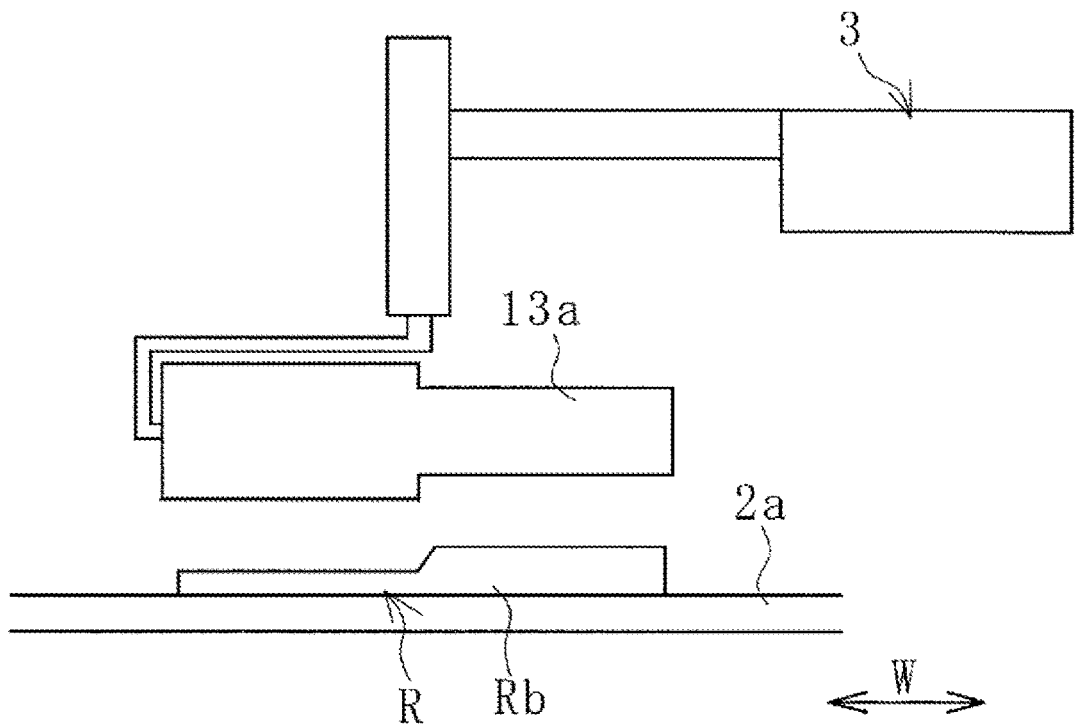

As illustrated in FIG. 12, the band-shaped rubber member R often has a unique cross-sectional shape (profile). As illustrated in FIG. 12(A), such a band-shaped rubber member R is preferably configured to independently move vertically each of the plurality of pressing rollers 13a arranged side by side in the width direction W. Alternatively, as illustrated in FIG. 12(B), a configuration is preferred in which one of the pressing rollers 13a midway in the width direction W has a different outer diameter. That is, the outer diameter of the pressing roller 13a is appropriately set in accordance with the cross-sectional shape (profile) of the band-shaped rubber member R.

According to the pressing roller 13a illustrated in FIG. 12, while suppressing deformation of the band-shaped rubber member R, and the band-shaped rubber member is compression bonded to the conveyor belt 2a. As a result, it becomes increasingly advantageous to suppress contraction of the band-shaped rubber member R over time. Note that the pressing roller 13a may be omitted, and the pressing roller 11 of the trailing end holding mechanism 7 of the above-described embodiment can also be used as the pressing roller 13a.

Figure 13:
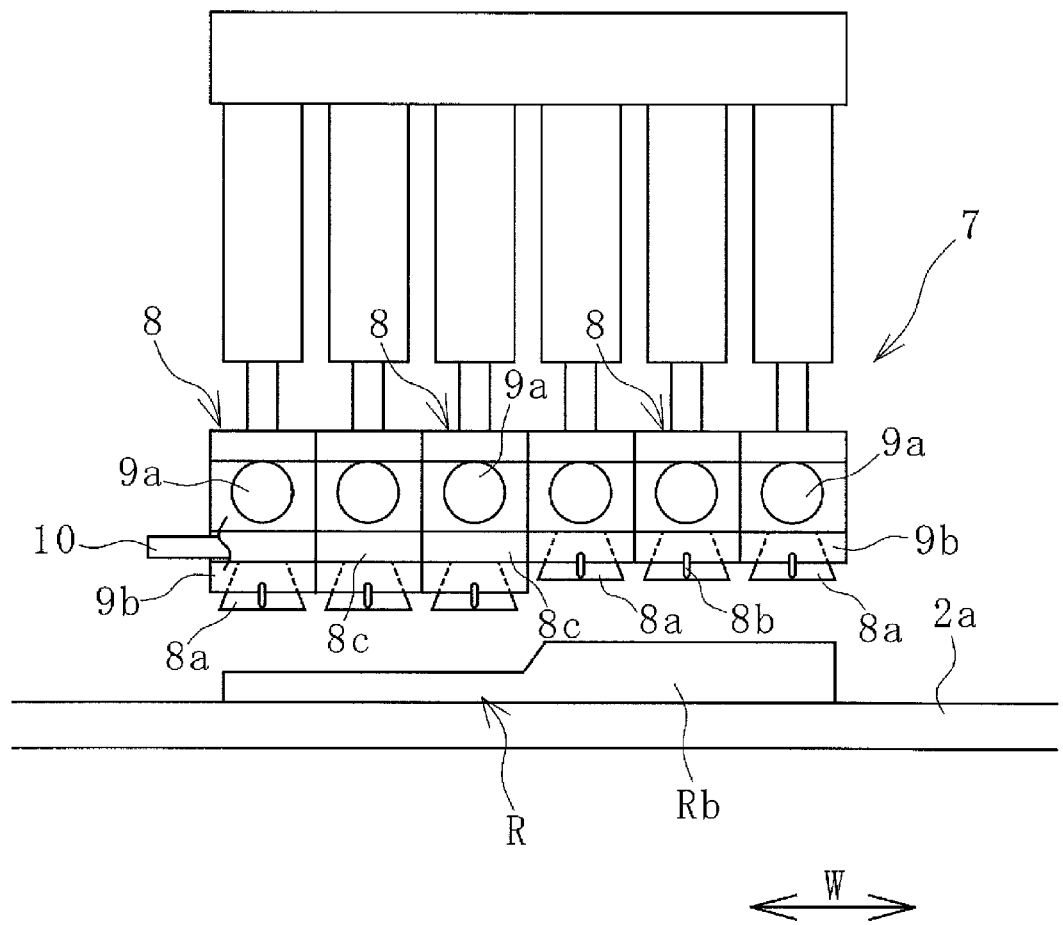
FIG. 13 is an explanatory diagram illustrating, in a front view, a modified example of the trailing end holding mechanism.

As illustrated in FIG. 13, for the band-shaped rubber member R having a unique cross-sectional shape (profile), a structure is preferred in which the suction pad 8a is attached to the block base 9b with the height adjustment portion 8c such as a shim interposed therebetween. In other words, depending on the cross-sectional shape (profile) of the band-shaped rubber member R, the vertical positions of each of the suction pads 8a arranged side by side is appropriately set by interposing the height adjustment portion 8c. This is advantageous to suppressed deformation of the trailing end Rb by each of the suction pads 8a, and to firmly adhere and hold the trailing end Rb. The holding force by the needle-like body 8b can also be increased.

Figure 14:
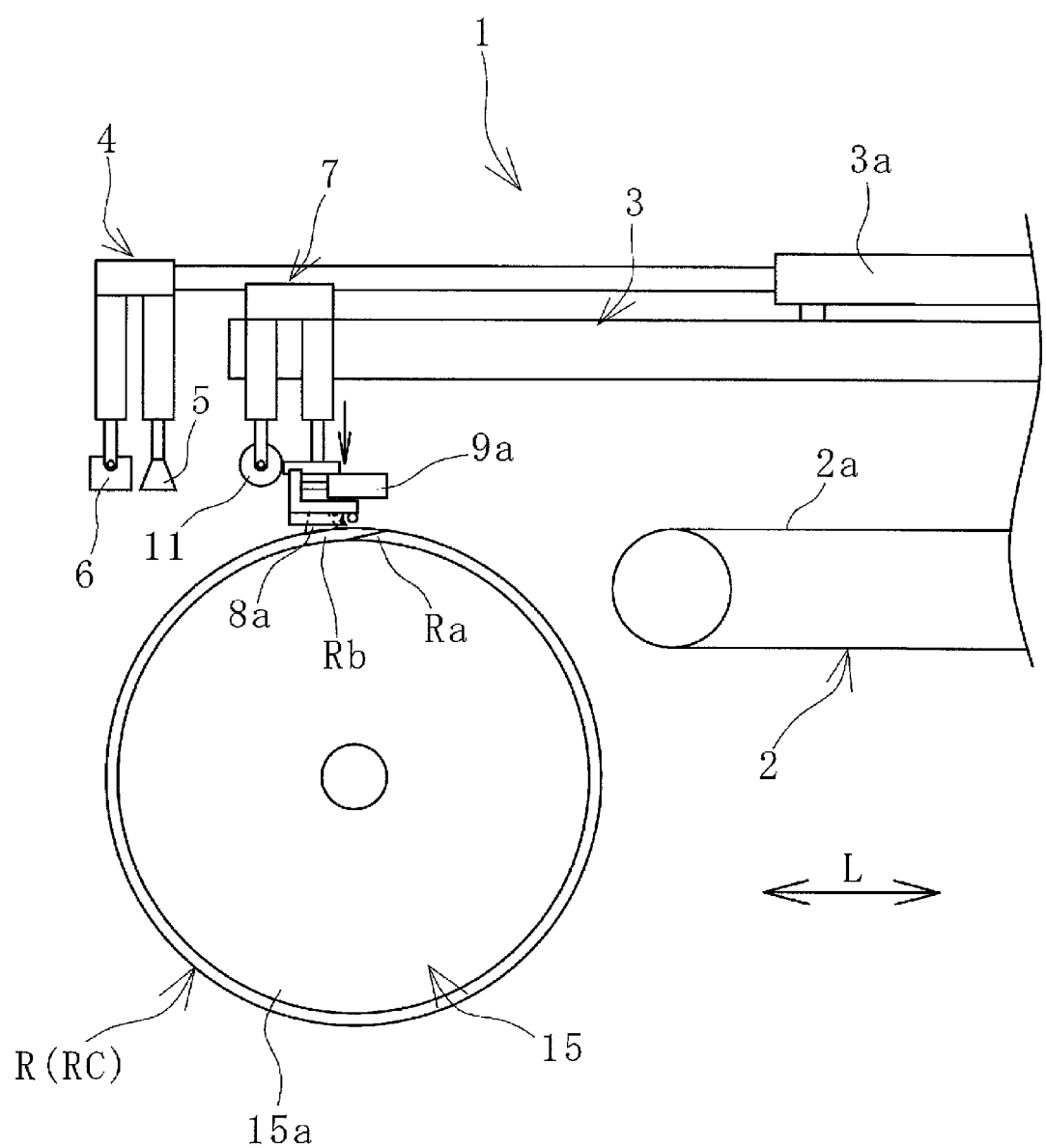
FIG. 14 is an explanatory diagram illustrating, in a side view, a state in which an elongated band-shaped rubber member is wound around an outer circumferential surface of a forming drum.

The band-shaped rubber member R having achieved the target length G is immediately wound on the outer circumferential surface 15a of the forming drum 15 as illustrated in FIG. 14, and is used to manufacture the annular rubber member RC. Thus, the band-shaped rubber member R is conveyed toward the forming drum 15 by rotating and driving the conveyor belt 2a. At this time, the advancing/retracting cylinder 3a advances the leading end holding mechanism 4 at an identical speed by synchronizing the leading end holding mechanism 4 to the band-shaped rubber member R being conveyed. In addition, the trailing end holding mechanism 7 is advanced and moved along the frame 3 at an identical speed synchronously with the band-shaped rubber member R to be conveyed. Next, with the rotation of the forming drum 15 stopped, the leading end holding portion 5 is moved downward, and the leading end Ra, which has been unheld, is disposed on the outer circumferential surface 15a of the forming drum 15. Here, the leading end pressing portion 6 is moved downward, and the leading end Ra is firmly attached to the outer circumferential surface 15a. The position where the leading end Ra is disposed on the outer circumferential surface 15a of the forming drum 15 is preferably the top portion of the forming drum 15 in the drum circumferential direction. As a result, the leading end Ra is more stably positioned and easily attached to the outer circumferential surface 15a.

Next, the forming drum 15 is rotated, and the conveyor belt 2a is rotationally driven in synchronization with this rotation, the band-shaped rubber member R is conveyed toward the forming drum 15, and the trailing end holding mechanism 7 is advanced and moved along the frame 3 in synchronization with the band-shaped rubber member R being conveyed. The circumferential speed on the outer circumferential surface 15*a*, the conveyance speed of the conveyance conveyor 2, and the movement speed of the trailing end holding mechanism 7 are preferably an identical speed.

Figure 15:
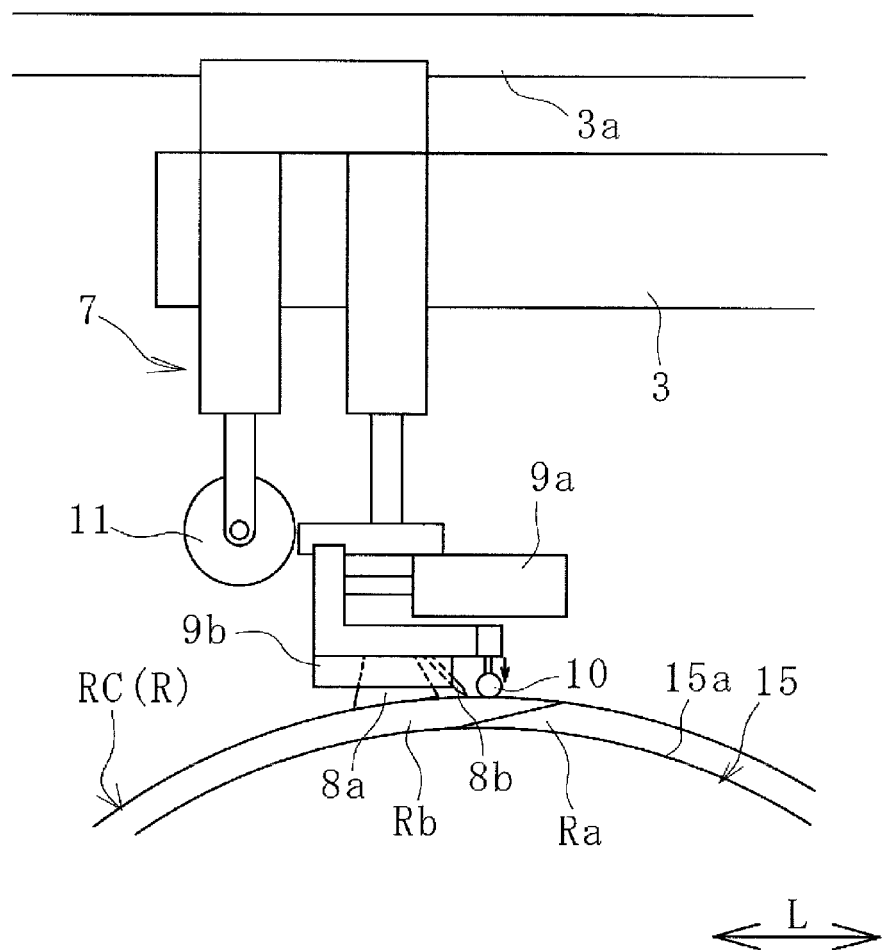
FIG. 15 is an explanatory diagram illustrating, in a side view, a step of releasing the hold on the trailing end of the band-shaped rubber member of FIG. 14 to compression bond the trailing end to the leading end.

Next, the trailing end holding portion 8 is moved downward to bring the trailing end Rb being held into contact with the leading end Ra wound on the outer circumferential surface 15*a*. Thereafter, as illustrated in FIG. 15, the suction by the suction pad 8*a* is stopped and the hold on the trailing end Rb is released.

Immediately after this step, the pressing bar 10 is moved downward, and the trailing end Rb and the leading end Ra are compression bonded by pressing the top surface of the trailing end Rb to form the annular rubber member RC. In this way, when the pressing bar 10 disposed on the top surface side of the trailing end Rb and extending in the width direction W is moved toward the top surface of the trailing end Rb to press the trailing end Rb, it is possible to firmly join the trailing end Rb and the leading end Ra. When the holding by the trailing end holding portion 8 is released, the band-shaped rubber member R tries to contract, however, by pressing the trailing end Rb with the pressing bar 10, opening of the joining portion between the trailing end Rb and the leading end Ra can be prevented, which is advantageous in suppressing contraction of the band-shaped rubber member R.

Figure 16:
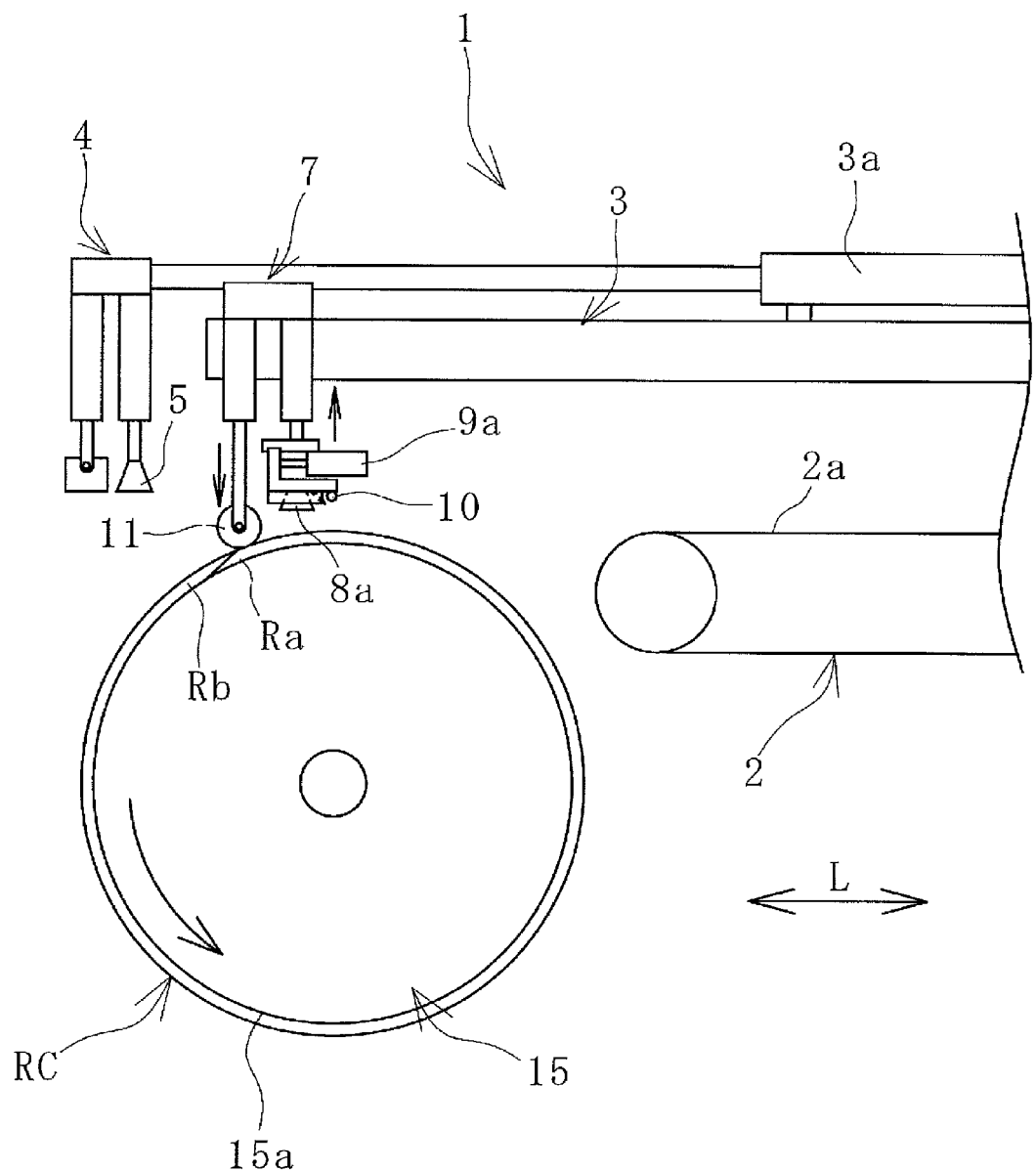
FIG. 16 is an explanatory diagram illustrating, in a side view, a step of further compression bonding the leading end and the trailing end of FIG. 15.

Next, as illustrated in FIG. 16, the pressing roller 11 is moved downward to abut the outer circumferential surface of the annular rubber member RC, and the forming drum 15 is rotated. As a result, the joining portion between the trailing end Rb and the leading end Ra is further compression bonded by the pressing roller 11 to reliably prevent opening of the joining portion.

Note that the timing at which the step of elongating the trailing end Rb illustrated in FIG. 10 is performed is not limited to the case illustrated in the previous embodiment, and can be performed at a desired timing. For example, the step can be performed with a large portion of the band-shaped rubber member R being wound around the outer circumferential surface 15*a* of the forming drum 15 (wrapped around the trailing end Rb and the peripheral portion thereof).

The invention claimed is:

1. A manufacturing device for an unvulcanized band-shaped rubber member configured to elongate the band-shaped rubber member to a target length, comprising:
a placement portion onto which the band-shaped rubber member cut at a predetermined length is placed in a flat state;
a position sensor that detects, across a width direction of the band-shaped rubber member, a leading end and a trailing end of the band-shaped rubber member placed in the flat state, the position sensor that detects the leading end being a same position sensor that detects the trailing end;
a control unit into which detection data from the position sensor is input;
a leading end holding mechanism that holds the leading end; and
a trailing end holding mechanism that holds the trailing end,
at least one of the leading end holding mechanism and the trailing end holding mechanism comprising a plurality of holding portions arranged side by side in the width direction of the band-shaped rubber member, and movement portions that each move one of the plurality of holding portions individually in a front-rear direction of the band-shaped rubber member, a displacement of each of the movement portions in the front-rear direction being controlled by the control unit based on the detection data and the target length to adjust a degree of elongation in the front-rear direction at or near a held portion of the band-shaped rubber member held by each of the plurality of holding portions, wherein
the leading end holding mechanism and the trailing end holding mechanism are both positioned on a same side of the band-shaped rubber member relative to the flat state of the band-shaped rubber member,
each of the holding portions is disposed below a respective block base,
at least one height adjustment portion is interposed between at least one of the holding portions and the respective block base, and
the vertical position of each of the holding portions is set depending on a cross-sectional shape of the band-shaped rubber member by using the height adjustment portion.

2. The manufacturing device for an unvulcanized band-shaped rubber member according to claim 1, wherein the position sensor is individually installed for each of the plurality of holding portions.

3. The manufacturing device for an unvulcanized band-shaped rubber member according to claim 2, wherein each of the plurality of holding portions is a suction pad that suctions a top surface of the band-shaped rubber member.

4. The manufacturing device for an unvulcanized band-shaped rubber member according to claim 3, wherein a placement surface of the placement portion is a placement surface onto which the band-shaped rubber member placed in the flat state is attached without being shifted in the front-rear direction and the band-shaped rubber member being in a state with no expansion or contraction in the front-rear direction.

5. The manufacturing device for an unvulcanized band-shaped rubber member according to claim 4, comprising a pressing roller that rolls on the top surface of the band-shaped rubber member placed in the flat state before the position sensor detects, across the width direction of the band-shaped rubber member, the leading end and the trailing end of the band-shaped rubber member.

6. The manufacturing device for an unvulcanized band-shaped rubber member according to claim 5, wherein the placement portion is a conveyance conveyor that conveys the band-shaped rubber member.

7. The manufacturing device for an unvulcanized band-shaped rubber member according to claim 1, wherein each of the plurality of holding portions is a suction pad that suctions a top surface of the band-shaped rubber member.

8. The manufacturing device for an unvulcanized band-shaped rubber member according to claim 1, wherein a placement surface of the placement portion is a placement surface onto which the band-shaped rubber member placed in the flat state is attached without being shifted in the front-rear direction and the band-shaped rubber member being in a state with no expansion or contraction in the front-rear direction.

9. The manufacturing device for an unvulcanized band-shaped rubber member according to claim 8, comprising a pressing roller that rolls on a top surface of the band-shaped rubber member placed in the flat state before the position sensor detects, across the width direction of the band-shaped rubber member, the leading end and the trailing end of the band-shaped rubber member.

10. The manufacturing device for an unvulcanized band-shaped rubber member according to claim 1, wherein the placement portion is a conveyance conveyor that conveys the band-shaped rubber member.

11. The manufacturing device for an unvulcanized band-shaped rubber member according to claim 1, wherein the leading end is in the flat state when detected by the position sensor.

12. The manufacturing device for an unvulcanized band-shaped rubber member according to claim 1, wherein the at least one of the leading end holding mechanism and the trailing end holding mechanism comprising the plurality of holding portions arranged side by side in the width direction of the band-shaped rubber member is the leading end holding mechanism.

13. The manufacturing device for an unvulcanized band-shaped rubber member according to claim 1, wherein the at least one of the leading end holding mechanism and the trailing end holding mechanism comprising the plurality of holding portions arranged side by side in the width direction of the band-shaped rubber member is both the leading end holding mechanism and the trailing end holding mechanism.

14. A method of manufacturing an unvulcanized band-shaped rubber member in which the band-shaped rubber member cut at a predetermined length is elongated to a target length, the method comprising:

detecting across a width direction of the band-shaped rubber member, by a position sensor, a leading end and a trailing end of the band-shaped rubber member placed in a flat state on a placement portion, and inputting detection data from the position sensor into a control unit, the position sensor that detects the leading end being a same position sensor that detects the trailing end; and by configuring at least one of a leading end holding mechanism that holds the leading end and a trailing end holding mechanism that holds the trailing end to comprise a plurality of holding portions arranged side by side in the width direction of the band-shaped rubber member, and movement portions that each move one of the plurality of holding portions individually in a front-rear direction of the band-shaped rubber member, holding the leading end by the leading end holding mechanism, and holding the trailing end by the trailing end holding mechanism, controlling, by the control unit, based on the detection data and the target length, a displacement of each of the movement portions in the front- rear direction to adjust a degree of elongation in the front-rear direction at or near a held portion of the band-shaped rubber member held by each of the plurality of holding portion; wherein each of the holding portions is disposed below a respective block base, and by attaching at least one of the holding portions to the respective block base by interposing a height adjustment portion, the vertical position of each of the holding portions is set depending on a cross-sectional shape of the band-shaped rubber member.

15. A manufacturing device for an unvulcanized band-shaped rubber member configured to elongate the band-shaped rubber member to a target length, comprising:

a placement portion onto which the band-shaped rubber member cut at a predetermined length is placed in a flat state;

a position sensor that detects, across a width direction of the band-shaped rubber member, a leading end and a trailing end of the band-shaped rubber member placed in the flat state, the position sensor that detects the leading end being a same position sensor that detects the trailing end;

a control unit into which detection data from the position sensor is input;

a leading end holding mechanism that holds the leading end; and a trailing end holding mechanism that holds the trailing end, wherein at least one of the leading end holding mechanism and the trailing end holding mechanism comprising a plurality of holding portions arranged side by side in the width direction of the band-shaped rubber member, and movement portions that each move one of the plurality of holding portions individually in a front-rear direction of the band-shaped rubber member, a displacement of each of the movement portions in the front-rear direction being controlled by the control unit based on the detection data and the target length to adjust a degree of elongation in the front-rear direction at or near a held portion of the band-shaped rubber member held by each of the plurality of holding portions, and wherein the manufacturing device includes only a single one of the position sensor, the position sensor being configured to move across the width direction of the band-shaped rubber member to detect an entire width of the band-shaped rubber member.

* * * * *